US006994368B2

(12) United States Patent  (10) Patent No.: US 6,994,368 B2
Brown  (45) Date of Patent: Feb. 7, 2006

(54) BICYCLE AUXILIARY WHEEL ATTACHMENT

(76) Inventor: Charles Brown, 100 Kramer Ct., Dothan, AL (US) 36350

(*) Notice: Subject to any disclaimer, the term of this patent is extended or adjusted under 35 U.S.C. 154(b) by 1 day.

(21) Appl. No.: 10/763,169

(22) Filed: Jan. 26, 2004

(65) Prior Publication Data
US 2005/0161899 A1    Jul. 28, 2005

(51) Int. Cl.
B62H 1/12    (2006.01)
(52) U.S. Cl. ................... 280/293; 280/288.4; D12/114
(58) Field of Classification Search ............... 280/293, 280/288.4, 301, 302, 303; D12/114; 180/287
See application file for complete search history.

(56) References Cited

U.S. PATENT DOCUMENTS

| 1,855,172 | A | * | 4/1932 | Hess | 280/293 |
| 2,439,755 | A | * | 4/1948 | Schwinn | 280/282 |
| 2,512,524 | A | * | 6/1950 | Gallo, Jr. et al. | 280/7.1 |
| 2,561,268 | A | * | 7/1951 | Dyksma | 280/301 |
| 2,647,764 | A | * | 8/1953 | Anderson | 280/293 |
| 2,682,418 | A | * | 6/1954 | Honig | 280/304 |
| 2,712,947 | A | * | 7/1955 | Pawsat et al. | 280/293 |
| 2,723,133 | A |   | 11/1955 | Paswat | |
| 2,752,169 | A | * | 6/1956 | Abel | 280/304 |
| 2,776,845 | A | * | 1/1957 | Pearl | 280/304 |
| 2,793,877 | A |   | 5/1957 | Meier et al. | |
| 2,817,540 | A |   | 12/1957 | Paswat | |
| 3,437,352 | A |   | 4/1969 | Longo | |
| 4,012,054 | A |   | 3/1977 | Moore | |
| 4,288,090 | A | * | 9/1981 | Muller et al. | 280/293 |
| 4,810,000 | A |   | 3/1989 | Saunders | |
| 5,064,213 | A |   | 11/1991 | Storch | |
| 5,242,183 | A | * | 9/1993 | Oberg et al. | 280/293 |
| 5,330,221 | A | * | 7/1994 | Sutton | 280/293 |
| 5,338,204 | A |   | 8/1994 | Herndon | |
| 5,492,354 | A |   | 2/1996 | Rainey | |
| 6,113,122 | A |   | 9/2000 | Plana | |
| 6,318,745 | B1 |   | 11/2001 | Sharp, III | |
| 6,398,248 | B1 |   | 6/2002 | Dodson | |
| 6,419,256 | B1 |   | 7/2002 | Clark | |
| D463,327 | S | * | 9/2002 | Bulson | D12/114 |
| 6,488,302 | B2 |   | 12/2002 | Coates | |
| 6,523,848 | B1 |   | 2/2003 | Liu | |
| 6,588,788 | B2 |   | 7/2003 | Clark | |
| 2002/0135146 | A1 |   | 9/2002 | Hsing | |

FOREIGN PATENT DOCUMENTS

| AU | 0474361 A1 | * | 11/1992 |
| DE | 3302581 | | 7/1984 |
| DE | 3728017 | | 8/1987 |
| GB | 2117336 | | 10/1983 |
| GB | 2104464 | | 3/1993 |

* cited by examiner

Primary Examiner—Lesley D. Morris
Assistant Examiner—Daniel Yeagley
(74) Attorney, Agent, or Firm—Richard C. Litman

(57) ABSTRACT

The auxiliary wheel attachment for a bicycle comprises flat metal strip material forming a frame that is rigid and strong enough to support the weight of an adult rider. The use of flat strip material allows the auxiliary wheel attachment to be fabricated using conventional metal cutting and bending techniques.

12 Claims, 5 Drawing Sheets

BICYCLE AUXILIARY WHEEL ATTACHMENT

BACKGROUND OF THE INVENTION

1. Field of the Invention

The present invention relates to an auxiliary wheel attachments for bicycles, and particularly to a frame for attaching the auxiliary wheels to the bicycle, and wherein the frame is rigid enough to be used by adults.

2. Description of the Related Art

Auxiliary or training wheels are well known for preventing the tipping of a bicycle while a novice rider, who has not yet learned to balance on the bicycle's two wheels, practices riding the bicycle. While most of these devices have been intended for children who are learning to ride a bicycle for the first time, there have been few auxiliary wheel arrangements that were designed with adults in mind. Adults who might need and use auxiliary wheels also include the elderly and the handicapped.

Most training wheel devices are light in construction, with wheel diameters that are small to be in proportion to a child's bicycle. These devices are unsuitable for an adult because of the adult's larger size and weight, and thus larger size of bicycle. Furthermore, a lack of rigidity in construction is often a problem because of the lightweight construction of the frame holding the auxiliary wheels.

U.S. Pat. No. 6,523,848, issued Feb. 23, 2003 to Liu, describes a bicycle supportive wheel mounting structure having a wheel holder frame for removably attaching the supporting wheel to the rear wheel assembly. In addition to the numerous assembly pieces employed for securing the supporting wheel, a threaded U-shaped shackle piece is used for securing a flat mounting base to a seat stay (see column 2, lines 5–25). U.S. Pat. No. 6,113,122, issued Sep. 5, 2000 to Plana, shows a stabilizer training wheel assembly for a bicycle having two side wheels connected to the rear wheel axle by a set of single structural rods. One end of each rod is attached to a training wheel. Along its length, it forms a helical torsion spring and terminates in a U-shaped attachment member. A section of the U-shaped member engages the axle of the rear wheel and is secured in place by bolts. U.S. Pat. No. 5,492,354, issued Feb. 20, 1996 to Rainey, describes an apparatus for mounting an auxiliary wheel to a bicycle. As in the patent to Plana, a single rod, which is configured into a helical spring, is formed along its length, and is used for attaching the training wheels to the rear of the bicycle. A portion of the rod forms a straight shank, which engages the wheel axle.

German Patent document 3,728,017, published Aug. 22, 1987 to Trzaska, discloses the conversion of a bicycle into a vehicle for a disabled person with the use of auxiliary wheels. Two U-shaped brackets are used to secure the device to the rear wheel axle and the bicycle frame. The device further includes stabilizing props to provide the required rigidity to the frame. U.S. Pat. No. 3,437,352, issued Apr. 8, 1967, shows a bicycle safety wheel attachment comprised of a U-bolt attached training wheel assembly. The device attaches to the rear of the bicycle frame and has stabilizing rods and uses spacers at the wheel attachment portion to ensure that the training wheels rotate freely on the device. U.S. Pat. No. 2,723,133, issued Nov. 8, 1955 to Pawsat, describes a bicycle stabilizer and a one-piece frame-axle member therefor. The device is attached to the bicycle frame near the rear wheel using U-bolts. The device includes stabilizers to give the device added rigidity and support.

Other patent documents showing training wheel devices include U.S. Published Patent Application 2002/0135146, published Sep. 26, 2002 to Hsing (inclination prevention device for preventing tipping while turning); U.S. Pat. No. 2,723,133, issued Nov. 8, 1955 to Pawsat (training wheels that attach to the bicycle frame with U-bolts); U.S. Pat. No. 2,793,877, issued May 28, 1957 to Meier et al. (training wheels with leaf springs for restoring the bicycle to vertical); U.S. Pat. No. 2,817,540, issued Dec. 24, 1957 to Pawsat (training wheel frame that provides a foot rest for a passenger); U.S. Pat. No. 4,012,054, issued Mar. 15, 1977 to Moore, (bicycle safety devices for preventing the bicycle from tipping over backwards when the front wheel is raised off the ground); U.S. Pat. No. 4,810,000, issued Mar. 7, 1989 to Saunders (training wheels which raise up and down in response to turning and leaning of the bicycle); U.S. Pat. No. 5,064,213, issued Nov. 12, 1991 to Storch (training wheels with springs that tend to keep the bicycle vertical); U.S. Pat. No. 5,338,204, issued Aug. 16, 1994 to Herndon (training wheels with a handle for raising and lowering the wheels); U.S. Pat. No. 6,318,745, issued Nov. 20, 2001 to Sharp, III (training wheels with springs that tend to keep the bicycle vertical); U.S. Pat. No. 6,398,248, issued Jun. 4, 2002 to Dodson (conventional training wheels in combination with a training handle attached to the bicycle frame); U.S. Pat. No. 6,419,256, issued Jul. 16, 2002 to Clark (turning wheels that make a noise when in contact with the ground and rotating); U.S. Pat. No. 6,488,302, issued Dec. 3, 2002 to Coates (training handle that attaches to the bicycle frame); U.S. Pat. No. 6,588,788, issued Jul. 8, 2003 to Clark (turning wheels that make a noise when in contact with the ground and rotating); United Kingdom Patent Application No. 2,104,464, published Mar. 9, 1993 to Sullivan (outrigger for two-wheeled vehicles); United Kingdom Patent Application No. 2,117,336, published Oct. 12, 1983 to Wright (training wheels with springs that tend to keep the bicycle vertical); and German Patent Document 3,302,581, published Jul. 26, 1984 to Kinkel (device for converting a conventional bicycle to a bicycle for the disabled).

None of the above inventions and patents, taken either singly or in combination, is seen to describe the instant invention as claimed. Thus, an auxiliary wheel attachment solving the aforementioned problems are desired.

SUMMARY OF THE INVENTION

The auxiliary wheel attachment of the present invention includes a structurally rigid, yet lightweight frame assembly made of stock steel strip pieces that are bent into appropriate shapes and then bolted together. Using a stock steel strip, such as a strip 1½ inches wide by 3/16 inches thick, allows the frame assembly to be manufactured at a lower cost compared to custom configuration frame parts. Only simple and conventional bending and cutting techniques are necessary for fabrication of the components of the frame. Also, the wheels used for the auxiliary wheel attachment may be stock parts, for example, 8-inch diameter lawn mower wheels.

Accordingly, it is a principal object of the invention to provide a bicycle auxiliary wheel attachment that is lightweight, yet sturdy enough to support the weight of an adult.

It is another object of the invention to provide a bicycle auxiliary wheel attachment in which the height of the wheels is adjustable depending on the size of the bicycle.

It is a further object of the invention to provide a bicycle auxiliary wheel attachment wherein the components of the attachment are made from stock steel strip, and formed using conventional cutting and bending techniques.

Still another object of the invention is to provide a bicycle auxiliary wheel attachment that is simple and convenient to install on a bicycle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
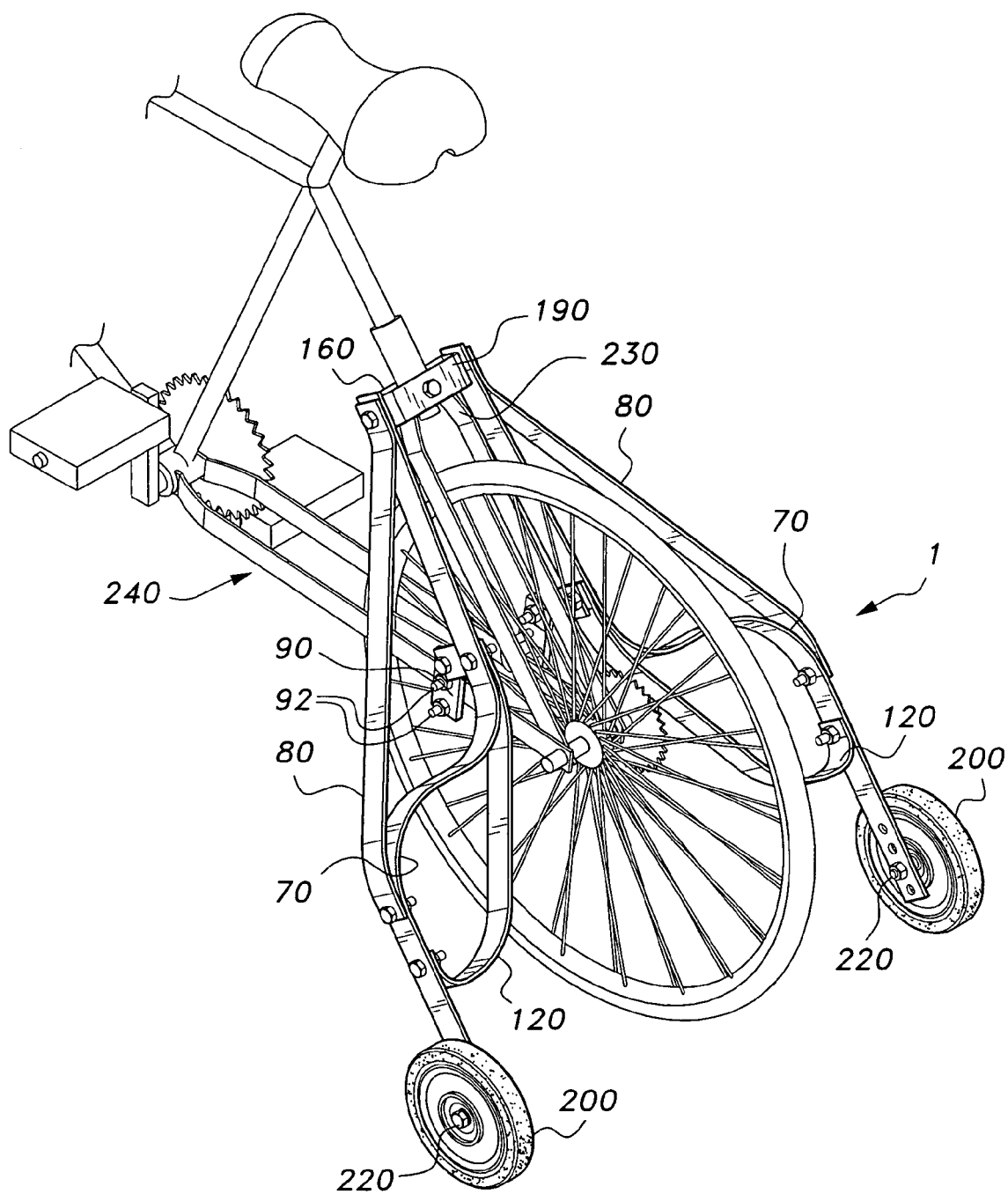
FIG. 1 is an environmental, perspective view of an auxiliary wheel attachment according to a first embodiment of the present invention.
Figure 2:
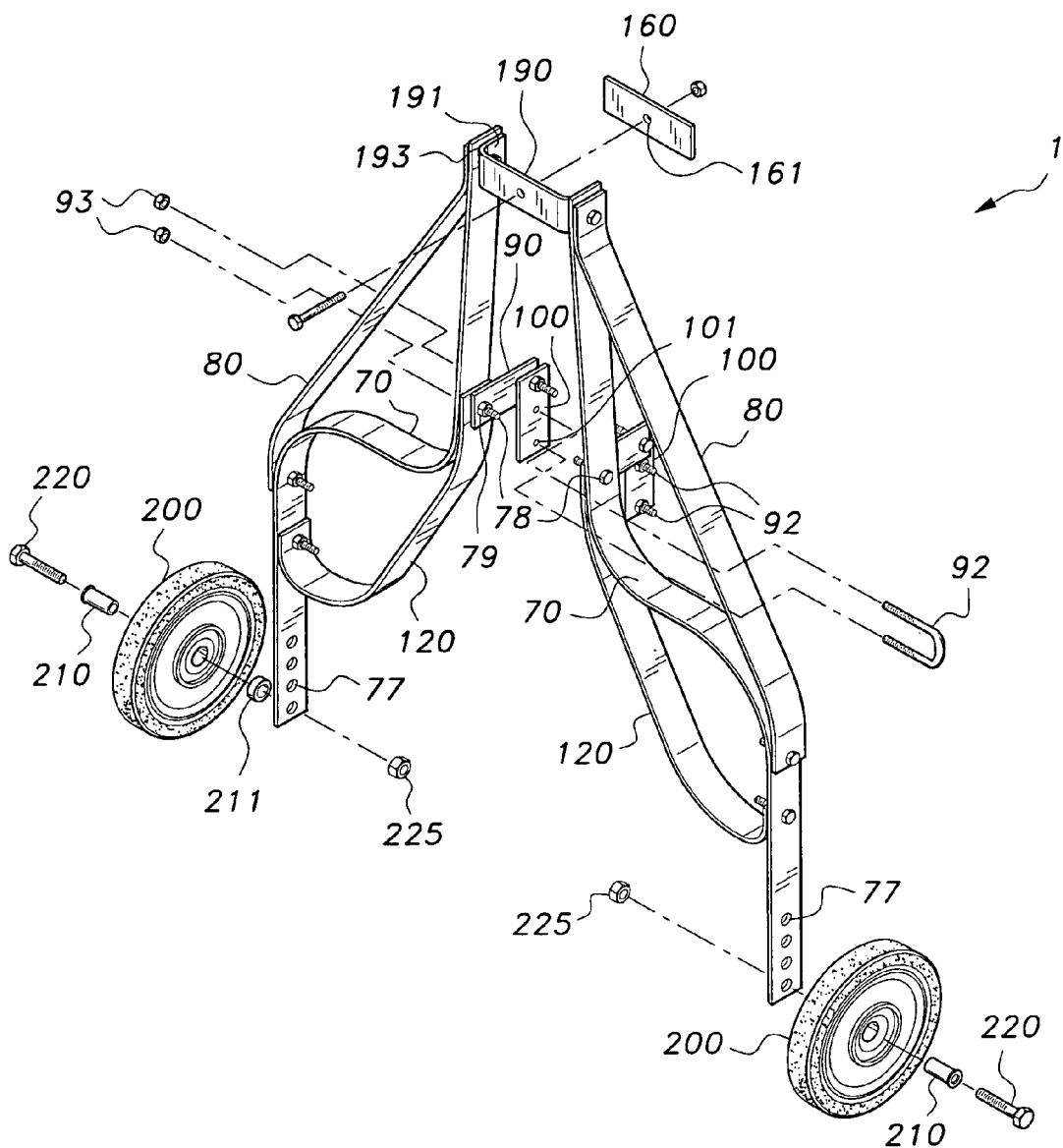
FIG. 2 is a partially exploded view of the auxiliary wheel attachment of FIG. 1 showing how the various parts are related.
Figure 3:
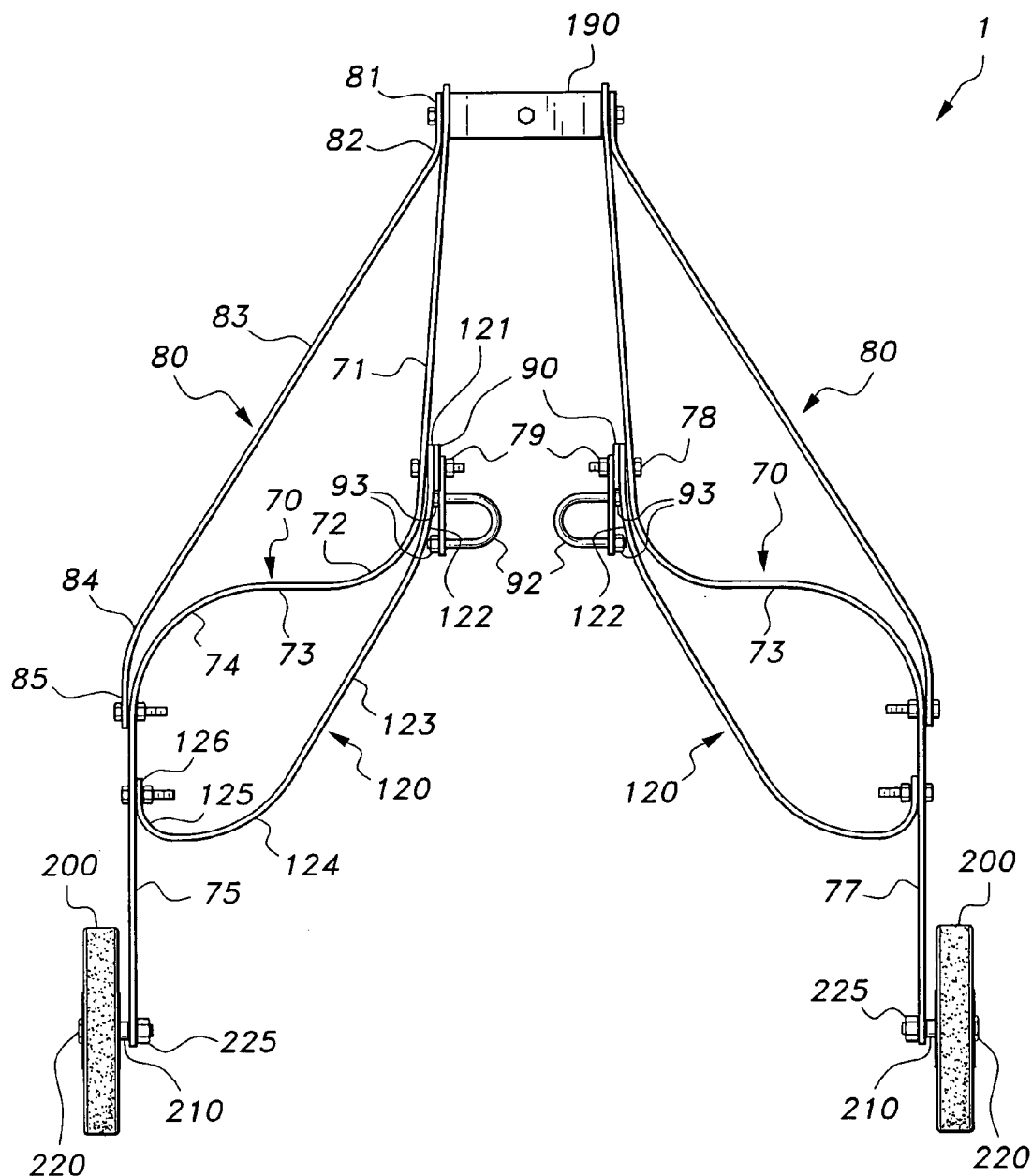
FIG. 3 is an elevational view of the auxiliary wheel attachment of FIG. 1, with the bicycle omitted, for purposes of clarity of the figure.

A first embodiment of the present invention is shown mounted on a bicycle in FIG. 1. The auxiliary wheel attachment is shown in partially exploded view in FIG. 2, and in front elevational view in FIG. 3. Referring to FIG. 3, a curved brace 70 comprises a generally serpentine member with three distinct straight sections integrally formed together with two curved sections. In particular, first long straight section 71 is integrally formed with a first curved section 72. The first curved section 72, in turn, is integrally formed with short straight section 73. The member then leads into a reverse curved section 74 that goes into a second long straight section 75. Each of the long straight sections 71 and 75 have two bolt holes for receiving connection bolts 78. Holes 77 (FIG. 2), at the bottom end of straight section 75, receive axle 220 for auxiliary wheel 200. As seen in FIG. 2, a spacer 211 (only one is shown) may be inserted between each wheel 200 and section 75, so that wheel 200 does not rub against its section 75. Further, although each wheel is shown with a separate bearing 210, it is most common in the trade to provide the wheel and bearing as an integral assembly.

Further referring to FIG. 3, strut 80 comprises three distinct straight sections integrally formed together with two curved sections. In particular, a first short straight section 81 is integrally formed with a first curved section 82, which is, in turn, integrally formed with long straight section 83. Straight section 83 leads into a second curved section 84 and then into a second short straight section 85. In each of the straight sections 81 and 85 are bolt holes for bolts 78.

FIG. 2 shows first and second flat plates 90 and 100. Plate 90 has two bolt holes, and plate 100 has three bolt holes 101. Two of these bolt holes 101 are spaced apart the same distance as the distance between the legs of U-bolt 92.

Again referring to FIG. 3, a curved member 120 comprises three distinct straight sections and three distinct curved sections. In particular, a first short straight section 121 is integrally formed with a first large radius section 122, which is, in turn, integrally formed with a long straight section 123. Integrally formed at the other end of straight section 123 is a second large radius section 124 leading into a small radius section 125. Integrally formed at the end of small radius section 125 is a second short straight section 126. Alternatively (and preferably), the curved member can be formed with three distinct straight sections and only two distinct curved sections. The curved section 124 could be eliminated, with straight section 123 ending in the sharply bent section 125.

FIG. 2 shows a third flat plate 160 of the invention. This plate 160 has a single bolt hole 161 in the center.

FIG. 2 also shows a U-shaped member of the invention. Two short legs 191 are integrally formed with long base 190 by radius sections 193. In the center of base 190 is a single bolt hole, and in the center of each of the legs 191 is a bolt hole.

Referring to FIGS. 1, 2 and 3, the assembly of the auxiliary wheel assembly 1 will be described. The top straight sections 71 and 81 of one curved brace 70 and one strut 80 are juxtaposed with one leg 191 of U-shaped member 190, and connected together with a bolt 78 and nut 79 through the appropriate bolt holes. The process is then repeated for the other side of the assembly. Since the second short straight section 85 of strut 80 is now juxtaposed with the appropriate bolt hole of curved brace 70, these are connected with a bolt 78 and nut 79 on both sides of the assembly. The first straight section 121 of curved member 120 is then juxtaposed with the appropriate bolt hole of one curved brace 70 and one hole of flat plate 90 and connected together with a bolt 78 and nut 79.

The process is repeated for the other side. Since the second short straight section 126 of curved member 120 is now aligned with the appropriate bolt hole, a bolt 78 and nut 79 are used to connect together curved brace 70 and curved member 120, and the process is repeated for the other side. All of the nut and bolt connections are made finger tight so that there is some movement possible between the various components.

At this point the auxiliary wheel assembly is ready for attachment to the bicycle. Reference to FIGS. 1 and 2 will assist in appreciating the following discussion. The upper part of the bicycle fork 230 is sandwiched between the U-shaped member 190 and the flat plate 160 and secured with a bolt 78 and nut 79. This connection is screwed down tightly with a wrench. One of the flat plates 100 is placed against one leg of the lower frame member 240 with the holes intended for the U-bolt 92 on either side of the leg. U-bolt 92 is then passed through the appropriate holes and secured tightly thereto with nuts 93. This process is repeated for the other side.

It is at this point that all of the connections are tightened down with a wrench so that the auxiliary wheel assembly is made completely rigid. Finally, the wheels with bearings 210 are attached to the appropriate axle holes with axle bolts 220, spacers 211 (if needed and used), and axle nuts 225 so that they hold the bicycle in an upright position.

Figure 4:
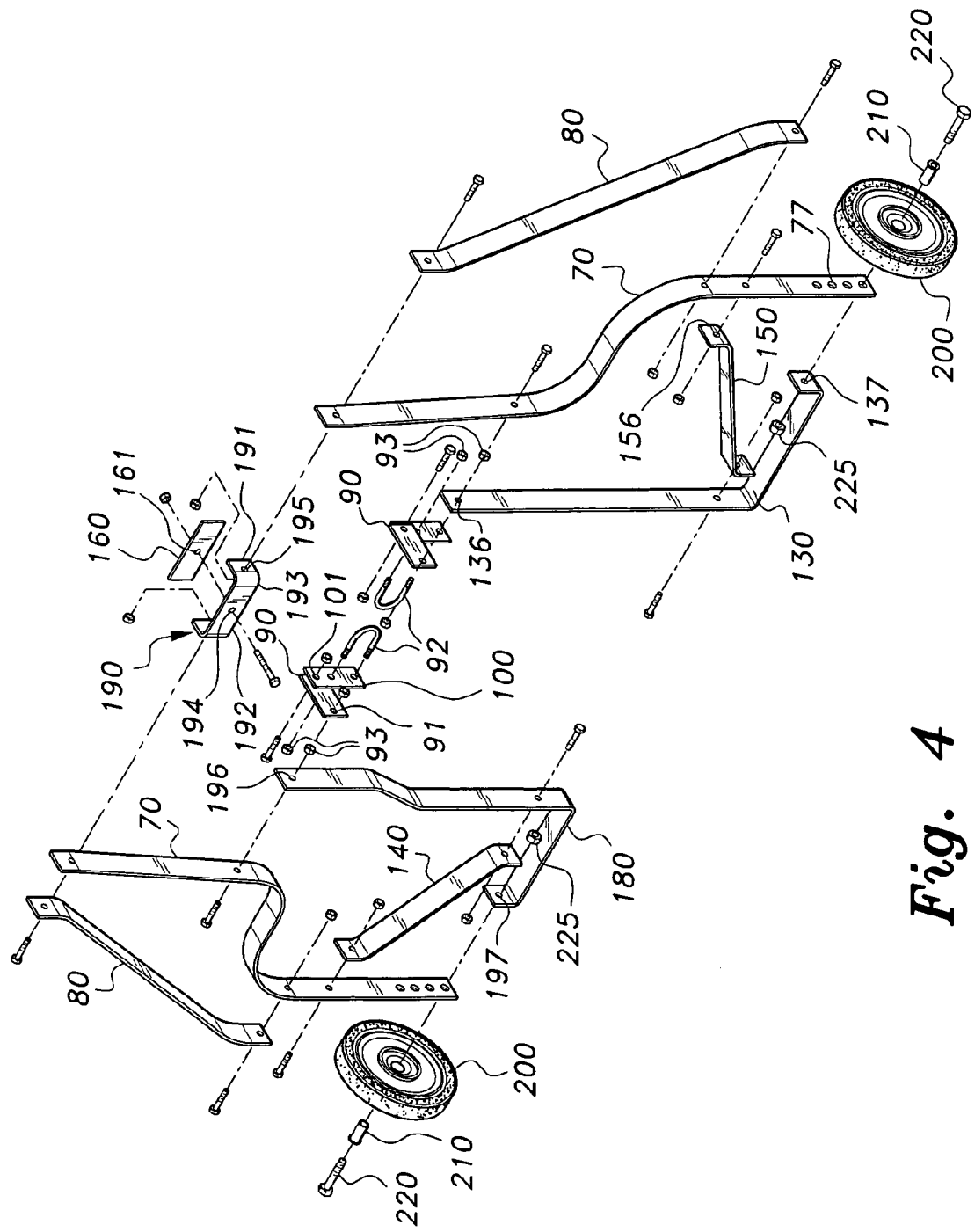
FIG. 4 is an exploded perspective view of a second embodiment of the auxiliary wheel attachment.

A second embodiment of the invention is shown in FIG. 4. Parts 70, 80, 90, 100, 160 and 190 are the same as described for the first embodiment above. The elements particular to the second embodiment are shown in FIGS. 4 and 5.

Figure 5:
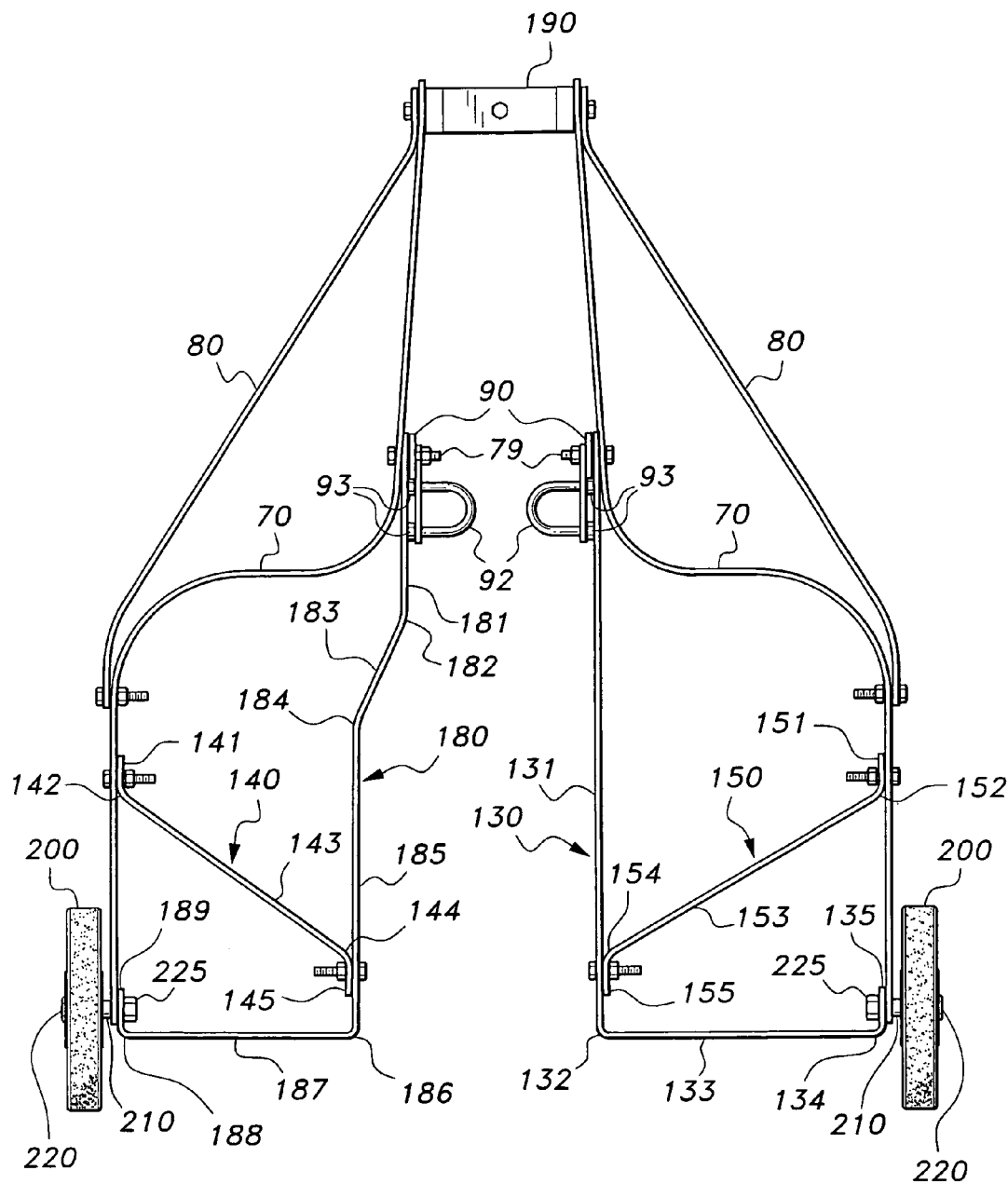
FIG. 5 is an elevational view of the auxiliary wheel attachment of FIG. 4, with the bicycle again omitted for purposes of clarity of the view.

FIGS. 4 and 5 show a first L-shaped member 130. A first long straight section 131 is integrally formed substantially perpendicular to a second long straight section 133 through a small radius 132. The second long straight section 133 is integrally formed at the other end substantially perpendicular to a short straight section 135 by a second small radius 134. Bolt holes 136 are provided in first straight section 131 and axle hole 137 is provided in the short straight section 135.

Further referring to FIGS. 4 and 5, first straight brace 140 comprises a long straight section 143 integrally formed at both ends to first and second short straight sections 141 and 145 by first and second radius sections 142 and 144.

Again referring to FIGS. 4 and 5, a second straight brace 150 of the second embodiment of the invention is similar to the first straight brace 140 except for somewhat different proportions. A long straight section 153 is integrally formed at both ends to first and second short straight sections 151 and 155 by first and second radius sections 152 and 154.

FIGS. 4 and 5 further show a second L-shaped member 180. First long straight section 181 is integrally formed to first short straight section 183 by first radius section 182. First short straight section 183 is integrally formed to second long straight section 185 by second radius section 184. Second long straight section 185 is integrally formed substantially perpendicular to third long straight section 187 by third radius section 186. Third long straight section 187 is integrally formed substantially perpendicular to second short straight section 189 by fourth radius section 188. Bolt holes 196 are provided in first long straight section 181 and second long straight section 185. Axle hole 197 is provided in second short straight section 189.

Referring again to FIGS. 4 and 5, assembly of the second embodiment of the invention will be described. The top straight sections 71 and 81 of one curved brace 70 and one strut 80 are juxtaposed with one leg 191 of U-shaped member 190 and connected together with a bolt 78 and nut 79 through the appropriate bolt holes. The process is then repeated for the other side of the assembly. Since the bolt hole in the second short straight section is now aligned with the appropriate bolt hole of curved brace 70, a bolt 78 and nut 79 are used to connect them together on both sides of the assembly. Next, the plate 90 is juxtaposed with the upper bolt hole 136 of first L-shaped member 130 and the appropriate bolt hole of curved brace 70, and bolt 78 and nut 79 used to fasten them together. Another plate 90 is then juxtaposed with the upper bolt hole 196 of second L-shaped member 180 and the appropriate bolt hole of curved brace 70, and bolt 78 and nut 79 used to fasten them together. Second flat plates 100 are attached to first flat plates 90 with bolts 78 and nuts 79 in the holes 101 not intended for the U-bolt 92. Then the two straight braces 140 and 150 are installed by lining up their bolt holes with the appropriate bolt holes in L-shaped members 140 and 150 and fastened with bolts 78 and nuts 79. All connections are fastened finger tight to allow adjustment of the wheel assembly to the bicycle.

At this point, the auxiliary wheel assembly is ready to attach to the bicycle. Again, reference is made to FIG. 1 to see the bicycle parts referred to below. The wheel assembly is positioned so that the second L-shaped member 180 is adjacent the sprocket side of the bicycle wheel. The upper part of the bicycle fork 230 is sandwiched between the U-shaped member 190 and the flat plate 160 and secured with a bolt 78 and nut 79. This connection is screwed down tightly with a wrench. The second flat plate 100 is placed against one leg of the lower frame member 240 with the holes intended for the U-bolt 92 on either side of the leg. U-bolt 92 is then passed through the appropriate holes and secured tightly thereto with nuts 93. This process is repeated for the other side.

It is at this point that all of the connections are tightened down with a wrench so that the auxiliary wheel assembly is made completely rigid. Finally, the wheels are attached to the appropriate axle holes with axle bolts 220, bearings 210, and axle nuts 225 so that they hold the bicycle in an upright position. It should be noted that unless the axle bolts are disposed in the bottommost axle holes, additional bolts and nuts will be required in the bottommost holes to make the assembly completely rigid.

It is to be understood that the present invention is not limited to the embodiments described above, but encompasses any and all embodiments within the scope of the following claims.

I claim:

1. An auxiliary wheel attachment for a bicycle, comprising:

two curved braces, two struts, two curved members, and two wheels mounted at one end of said curved braces, said curved braces, struts and curved members being rigidly connected together, wherein said attachment has sufficient strength and rigidity necessary to support the weight of an adult rider;

wherein said curved members each comprise a first short straight section integrally formed to a first large radius section, which is integrally formed to a lone straight section, which is integrally formed to a second large radius section, which is integrally formed to a small radius section, which is integrally formed to a second short straight section.

2. The auxiliary wheel attachment of claim 1, wherein the means for rigidly connecting said curved braces, struts, and curved members together comprise bolts and nuts.

3. The auxiliary wheel attachment of claim 1, wherein said curved braces each comprise a first long straight section, a first short straight section, and a second long straight section, said straight sections integrally formed together by first and second radius sections.

4. The auxiliary wheel attachment of claim 1, wherein said struts each comprise a first short straight section, a long straight section, and a second short straight section, said straight sections integrally formed together by first and second curved sections.

5. The auxiliary wheel attachment of claim 1, wherein a U-shaped member is connected to the other ends of said curved braces, said U-shaped member fitting against a portion of a bicycle underneath the seat when mounted to said bicycle.

6. The auxiliary wheel attachment of claim 1, wherein said braces, struts, and curved members comprise flat metal strip material.

7. An auxiliary wheel attachment for a bicycle, comprising:

two curved braces, two struts, two L-shaped members, and two wheels mounted on said L-shaped members, said braces, struts, and L-shaped members being rigidly connected together, wherein said attachment has sufficient strength and rigidity necessary to support the weight of an adult rider;

wherein one of said L-shaped members comprises a first long straight section integrally formed substantially perpendicular to a second long straight section, the second long straight section integrally formed substantially perpendicular to a short straight section, said straight sections integrally formed together by small radius sections, wherein said struts each comprise a first short straight section, a long straight section, and a second short straight section, said straight sections integrally formed together by first and second curved sections.

8. The auxiliary wheel attachment of claim 7, wherein a means for rigidly connecting said braces, struts, and L-shaped members together comprise bolts and nuts.

9. The auxiliary wheel attachment of claim 7, wherein said curved braces each comprise a first long straight section, a first short straight section, and a second long straight section, said straight sections integrally formed together by first and second radius sections.

10. The auxiliary wheels attachment of claim 7, wherein the other of said L-shaped members comprises a first long straight section integrally formed to a first short straight section by a first radius section, the first short straight radius section being integrally formed to second long straight section by a second radius section, the second long straight section being integrally formed substantially perpendicular to a third long straight section by a third radius section, the third long straight section being integrally formed substantially perpendicular to a second short straight section by a fourth radius section.

11. The auxiliary attachment of claim 7, wherein said braces, struts, and L-shaped members comprise flat metal strip material.

12. The auxiliary wheel attachment of claim 7, wherein a U-shaped member is connected to the other ends of said curved braces, said U-shaped member fitting against a portion of a bicycle underneath a seat of said bicycle when mounted to said bicycle.

* * * * *